United States Patent [19]

Igashira et al.

[11] Patent Number: 4,621,599
[45] Date of Patent: Nov. 11, 1986

[54] METHOD AND APPARATUS FOR OPERATING DIRECT INJECTION TYPE INTERNAL COMBUSTION ENGINE

[75] Inventors: Toshihiko Igashira, Toyokawa; Yasuyuki Sakakibara, Nishio; Toru Yoshinaga; Yasuhiro Takeuchi, both of Okazaki, all of Japan

[73] Assignee: Nippon Soken, Inc., Nishio, Japan

[21] Appl. No.: 680,045

[22] Filed: Dec. 10, 1984

[30] Foreign Application Priority Data

Dec. 13, 1983 [JP] Japan .................................. 58-233555
Feb. 8, 1984 [JP] Japan .................................. 59-22372

[51] Int. Cl.⁴ .............................................. F02B 3/00
[52] U.S. Cl. ..................................... 123/300; 123/305
[58] Field of Search ................. 123/299, 300, 301, 305

[56] References Cited

U.S. PATENT DOCUMENTS

| | | | |
|---|---|---|---|
| 2,692,587 | 10/1954 | Barber | 123/299 |
| 2,718,883 | 9/1955 | Taylor | 123/301 |
| 2,960,973 | 11/1960 | Davis | 123/301 |
| 3,094,518 | 7/1975 | Gavrun | 123/299 |
| 3,892,207 | 7/1975 | Weise | 123/305 |
| 3,924,598 | 12/1975 | Davis | 123/299 |
| 4,140,088 | 2/1979 | de Vulpillieres | 123/299 |
| 4,356,807 | 2/1982 | Tokura et al. | 123/299 |
| 4,414,940 | 11/1983 | Loyd | 123/299 |

Primary Examiner—Ronald B. Cox
Attorney, Agent, or Firm—Cushman, Darby & Cushman

[57] ABSTRACT

A spark-ignition type internal combustion engine has a fuel injection valve for supplying fuel directly to a cylinder and a spark plug arranged near the fuel injection valve for igniting fuel in the cylinder. Auxiliary fuel injection is performed in the vicinity of the top dead center of the compression stroke, the subsequent main fuel injection is performed after the auxiliary fuel injection is terminated, and concurrently, the spray produced by auxiliary fuel injection is ignited by the spark plug.

10 Claims, 18 Drawing Figures

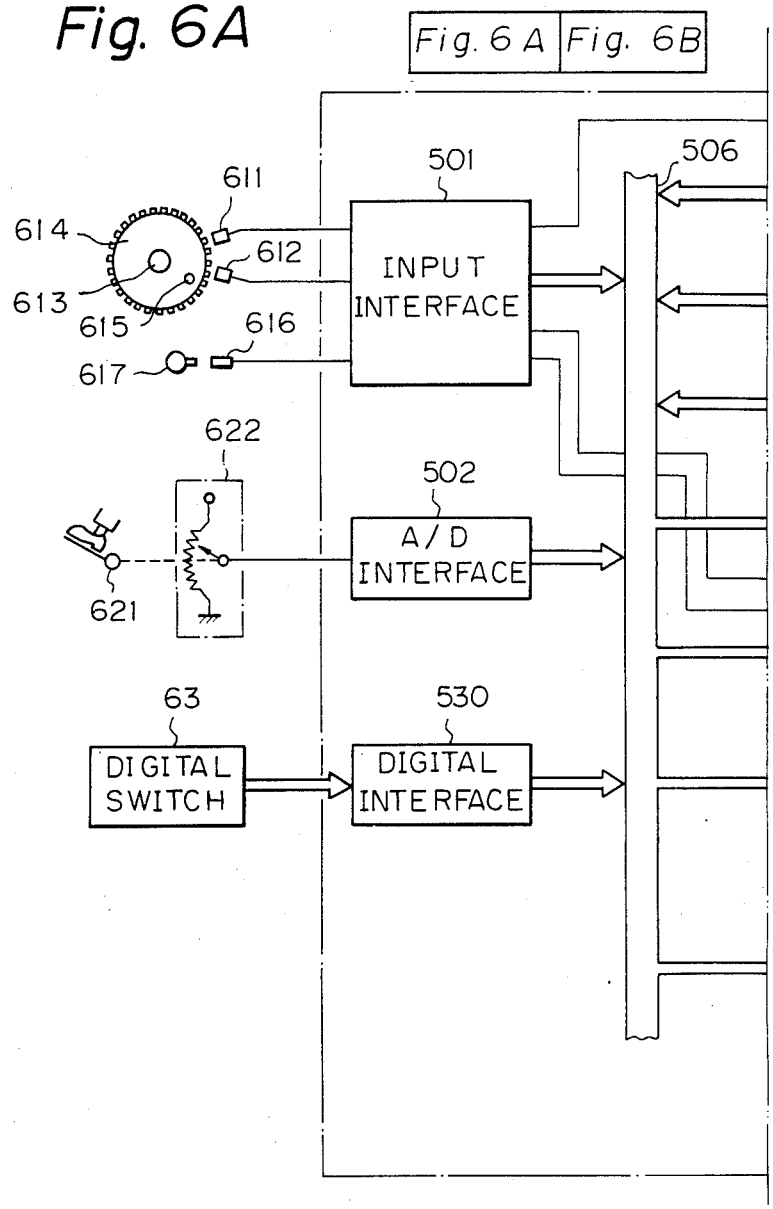

METHOD AND APPARATUS FOR OPERATING DIRECT INJECTION TYPE INTERNAL COMBUSTION ENGINE

BACKGROUND OF THE INVENTION

1. Field of the Invention

The present invention relates to a method and an apparatus for operating a direct injection (inside each cylinder) type internal combustion engine. In particular, the method and apparatus of the present invention are suitable for the operation of spark-ignition direct injection (DI) type engines.

2. Description of the Related Art

When a spray of fuel or vapor is to be ignited by a spark plug in an internal combustion engine, an optimum air-fuel mixture must be produced in the vicinity of the spark gap within the very short time that the spark is maintained, and this is difficult to achieve under all operating conditions. In other words, because of the various operating conditions occurring in an engine, a stable air-fuel mixture cannot always be formed in the vicinity of the spark gap at the proper ignition timing, resulting in unreliable ignition of the fuel or vapor.

SUMMARY OF THE INVENTION

It is an object of the present invention to alleviate the above problems by using an electrically operated fuel injection valve to perform main and auxiliary fuel injections in such a manner that a stable air-fuel mixture is always produced in the vicinity of the spark gap regardless of changes in the operation conditions of the engine, thereby providing reliable ignition of the fuel or vapor injected at all times.

It is another object of the present invention to synchronize the spark start timing, that is, the ignition timing, with the ON/OFF timing of the auxiliary fuel injection, or to delay the former with regard to the latter, so that a reliable ignition timing control can be performed.

According to a basic aspect of the present invention, there is provided a method for operating an internal combustion engine having a fuel injection valve for injecting fuel into a cylinder, a spark plug arranged adjacent to the fuel injection valve for carrying out ignition of the fuel in the cylinder, an ignition coil connected to the spark plug, and an igniter connected to the ignition coil. The method comprises the steps of: carrying out an auxiliary fuel injection (INJ-B) in the vicinity of the top dead center of the compression stroke; carrying out a subsequent main fuel injection (INJ-C) after the auxiliary fuel injection (INJ-B) is terminated; and carrying out the ignition of the spray produced by the auxiliary fuel injection (INJ-B) by the spark plug concurrently with the subsequent main fuel injection (INJ-C).

According to another aspect of the present invention, there is provided an apparatus for operating an internal combustion engine including a fuel injection valve for injecting fuel into a cylinder; a spark plug located adjacent to the fuel injection valve in the forward direction of a swirl formed in the cylinder for carrying out the ignition in the cylinder; an ignition coil connected to the spark plug; an igniter connected to the ignition coil; and an electric control circuit for supplying controlled energization signals to the fuel injection valve and the igniter. The electric control circuit produces the optimum energization signal for the fuel injection valve and the optimum energization signal for the igniter for carrying out a predetermined auxiliary fuel injection, and a subsequent main fuel injection following the predetermined auxiliary fuel injection, based on a signal representing the operating condition of the engine.

According to still another aspect of the present invention, there is provided an apparatus for operating an internal combustion engine including a fuel injection valve capable of supplying the fuel used for one explosion at three separate times. That is, first, a prior main fuel injection (INJ-A) in the vicinity of or preceding the bottom dead center of the compression stroke; second, a preceding auxiliary fuel injection (INJ-B) in the vicinity of the top dead center of the compression stroke; and third, a subsequent main fuel injection (INJ-C) following the auxiliary fuel injection (INJ-B).

The apparatus also includes a spark plug for producing a spark in synchronization with the auxiliary fuel injection (INJ-B); an ignition coil connected to the spark plug; and an igniter connected to the ignition coil.

BRIEF DESCRIPTION OF THE DRAWINGS

FIGS. 6, 6A, and 6B are block diagrams of the configuration of an electric control circuit in the apparatus shown in FIG. 1;

DETAILED DESCRIPTION OF THE PREFERRED EMBODIMENT

Figure 1:
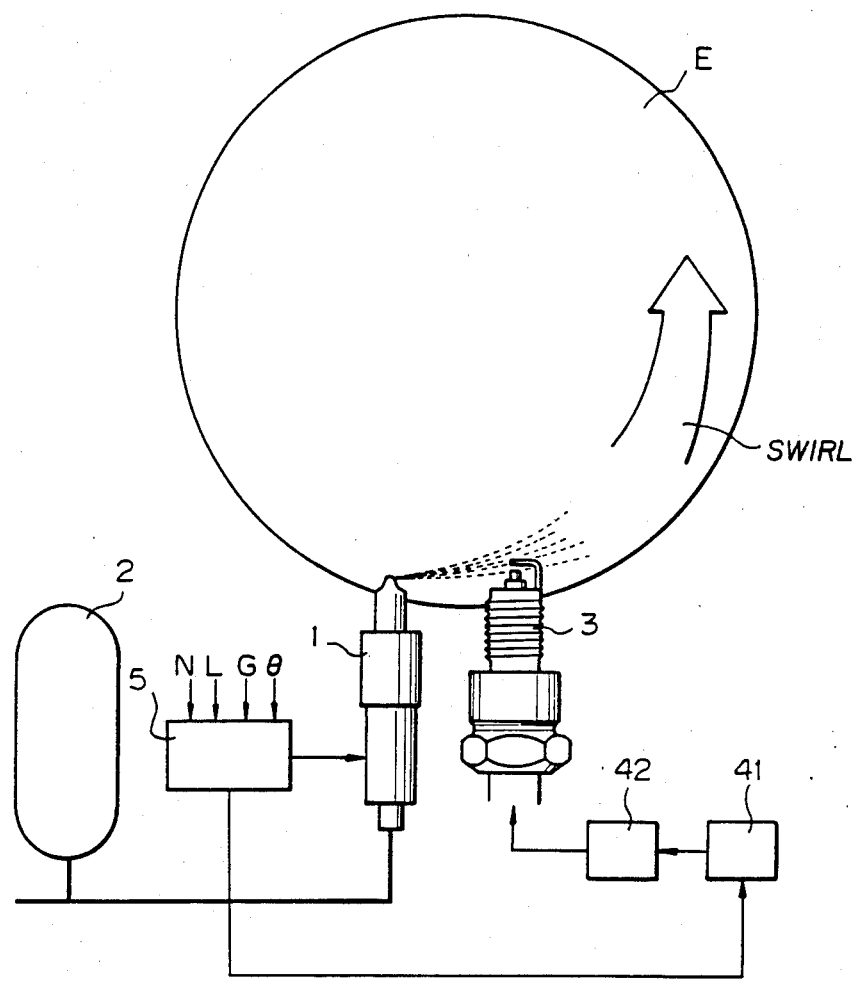
FIG. 1 is a view of an apparatus using a method for operating a spark-ignition cylinder injection internal combustion engine according to an embodiment of the present invention.

FIG. 1 shows an apparatus to which a method for operating a spark-ignition DI type internal combustion engine according to an embodiment of the present invention is applied. Referring to FIG. 1, reference symbol E denotes a combustion chamber. Since the engine shown in FIG. 1 is similar to a commercially available DI-type diesel engine, details of the engine are omitted. However, this engine has the following features.

First, low compression ratio of 8 to 14 as compared to that of 16 to 18 in a commercially available DI diesel engine. This is because, in the engine shown in FIG. 1, self-ignition of the fuel by compression is not required. Second, a spark plug 3 is incorporated. The spark plug 3 is of a type generally used for a gasoline engine (Otto-cycle engine) and has an ignition coil 42 and an igniter 41. This spark plug 3 is located in the vicinity of a fuel injection valve 1 in the forward direction of a swirl swirl. The swirl is an air current obtained when the shape of an intake port is of a known tangential or helical type common to DI-type diesel engines.

Third, the fuel injection valve 1 is electrically driven and high-pressure fuel is continuously and constantly supplied to the fuel injection valve 1. A piezoelectric effect is utilized to electrically drive the fuel injection valve 1, and an electric control circuit 5 is used to control the fuel injection valve 1 or to drive the igniter 41. The electric control circuit 5 receives signals representing operating conditions of the engine; e.g., the amount of the accelerator opening, the engine speed N, the calorific value Q (kcal/kg) of the fuel, and the crank angle $\theta$. Based on these input signals, the electric control circuit 5 determines an optimum valve opening duration and an optimum ignition timing. The electric control circuit 5 then operates the fuel injection valve 1 and energizes the igniter based on the drive signal. To ensure a continuous supply of pressurized fuel, for example, at 200 kg/cm$^2$, a high-pressure pump and a pressure regulator (not shown) are used. The pressurized fuel is accumulated in an accumulator 2 and is then supplied to the fuel injection valve 1.

The fuel injection valve 1 is a nozzle with a single nozzle opening directed in the forward direction of the swirl SWR. That is, the nozzle is directed toward a spark gap of the spark plug 3. The structural features of the engine E are the three features pointed out above.

Figure 2:
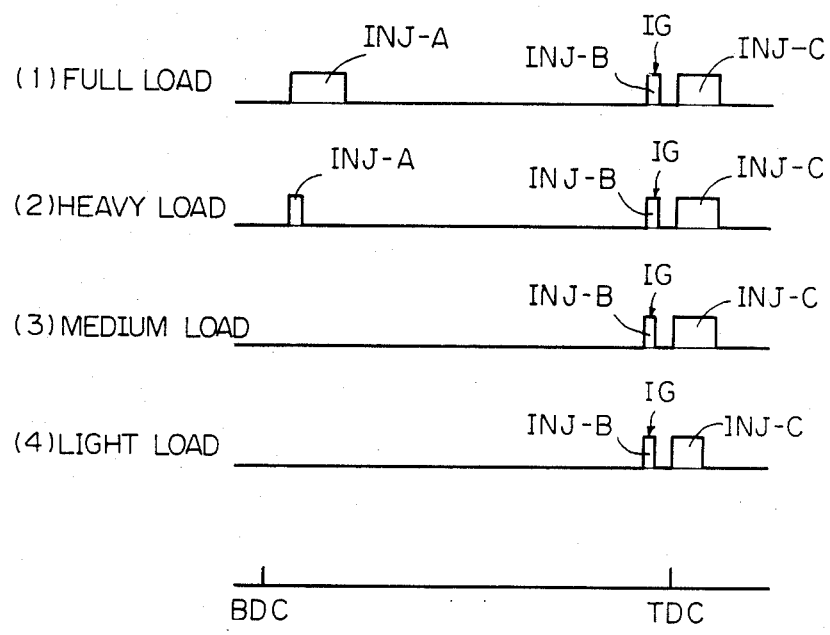
FIG. 2 is a timing chart explaining the operation of the apparatus shown in FIG. 1.

In a single power stroke of the engine, three fuel injections are performed at heavy load, and two fuel injections are performed at light load, both by the single fuel injection valve 1. This operation will be described with reference to FIG. 2. FIGS. 2(1) to 2(4) respectively show valve open signals of the fuel injection valve 1 for a full load, a heavy load, a medium load, and a light load, respectively. These signals are converted into drive voltages to open the fuel injection valve 1. Thus, the opening of the fuel injection valve 1 is controlled by the electric control circuit 5. Note that, in FIG. 2, the crank angle phase of the engine E, and hence, the timing, is plotted along the abscissa.

In the case of the full load, there are three fuel injections, i.e., prior main fuel injection INJ-A, auxiliary fuel injection INJ-B, and subsequent main fuel injection INJ-C.

The start timing of the prior main fuel injection INJ-A is that timing at which an intake valve is completely closed slightly after the bottom dead center (BDC) of the compression stroke of the engine E. This timing is fixed irrespective of the operating conditions of the engine. The period of the prior main fuel injection INJ-A in one-to-one correspondence with the fuel injection amount thereof is variably controlled in accordance with the engine speed, or the atmospheric pressure or temperature, so that the period will not exceed the smoke limit.

The start timing of the auxiliary fuel injection INJ-B falls within the range of crank angles of 50° CA to 10° CA before the top dead center (TDC) of the compression stroke. This start timing is variably controlled in accordance with the engine speed or the amount of the accelerator opening. In synchronism with the auxiliary fuel injection INJ-B, the spark plug 3 produces a spark to ignite the spark produced in this fuel injection. Details of this synchronization will be described later. The most suitable fuel injection amount of the auxiliary fuel injection INJ-B is about 10% of the sum of the fuel injection amounts in the prior main fuel injection INJ-A, the auxiliary fuel injection INJ-B, and the subsequent main fuel injection INJ-C. If the fuel injection amount of the auxiliary fuel injection INJ-B is too small, spark ignition failure will occur. However, if the fuel injection amount is too large, ignition delay is increased, and the amount of non-combusted hydrocarbon (HC) emitted at the exhaust is increased. This state is shown in FIG. 3.

Figure 3:
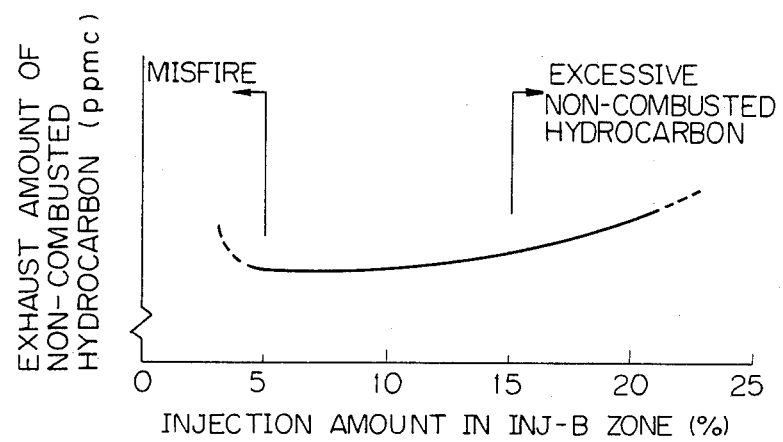
FIGS. 3 and 4 are graphs showing the operational characteristics of the apparatus shown in FIG. 1.

Referring to FIG. 3, the fuel injection amount (%) in the INJ-B zone is plotted along the abscissa, and the exhaust emission amount (ppmc) of the hydrocarbon (HC) is plotted along the ordinate. Since the range of the optimum fuel injection amount for the auxiliary fuel injection INJ-B is relatively wide, as can be seen from FIG. 3, its value can be fixed for varying operating conditions and the duration of the auxiliary fuel injection INJ-B is fixed; this duration period is about 100 $\mu$sec.

Figure 4:
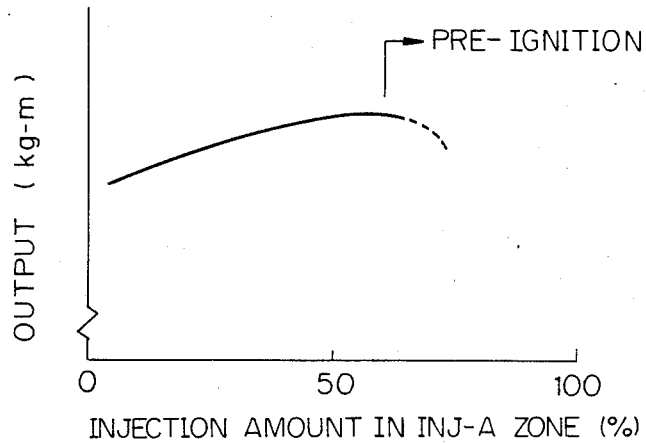

The start timing of the subsequent main fuel injection INJ-C is about 1 msec later than the termination of the auxiliary fuel injection INJ-B. This delay time is fixed for varying operating conditions of the engine. The fuel injection amount for the subsequent main fuel injection INJ-C is fixed, and its value is determined to provide an optimum fuel injection amount for the prior fuel injection INJ-A. Fuel injected in the prior fuel injection INJ-A is combusted in the power stroke and is therefore preferably large in amount in comparison with a diffuse combustion such as that of the auxiliary fuel injection INJ-B and the subsequent main fuel injection INJ-C. When the cetane number of the fuel is high or when the octane number is low, i.e., above or below a predetermined value, pre-ignition occurs and an output drop or damage to the engine may be caused. For this reason, the cetane number and the octane number must fall below a predetermined maximum value in accordance with each type of fuel used.

Where a light oil having a cetane number of 40 is used, as shown in FIG. 4, the maximum fuel injection amount for the prior main fuel injection INJ-A is about 50% of the sum of the fuel injection amounts of the prior main fuel injection INJ-A, the auxiliary fuel injection INJ-B, and the subsequent main fuel injection INJ-C. In FIG. 4, the INJ-A zone fuel injection amount is plotted along the abscissa, and the output (kg.m) is plotted along the ordinate.

The sum of the fuel injection amounts of the prior main fuel injection INJ-A, the auxiliary fuel injection INJ-B, and the subsequent main fuel injection INJ-C is determined to be below the smoke limit at full load. Since the smoke limit differs in accordance with the engine speed or atmospheric pressure, it is regulated in accordance with the fuel injection amount of the prior main fuel injection INJ-A, i.e., the duration of the prior main fuel injection INJ-A. The injection amount of the subsequent main fuel injection INJ-C is determined such that the fuel injection amount of the precedent main fuel injection INJ-A does not exceed the maximum fuel injection amount. When the fuel injection amount for INJ-C is determined to be too large for safety, the fuel injection amount for INJ-A is over-decreased resulting in an output drop. This factor is illustrated in FIG. 4.

The case of the heavy load shown in FIG. 2 will be described. When the amount of the accelerator opening is decreased to slightly less than that at full load, the fuel injection amount is decreased only by decreasing the duration of the prior main fuel injection INJ-A. The fuel injection amounts for INJ-B and INJ-C, i.e., the durations thereof, remain the same as those at full load. When the amount of the accelerator opening is decreased further and the duration of INJ-A reaches the regulation precision limit of the fuel injection valve 1, e.g., 50 μsec, the prior main fuel injection INJ-A is completed. When the prior main fuel injection INJ-A is completed and the amount of the accelerator opening is further decreased, the fuel injection amount is decreased by decreasing the duration of the subsequent main fuel injection INJ-C, as seen in the cases of the medium and light loads shown in FIG. 2.

The function and operation of the electric control circuit 5 for performing the above-mentioned control operations will be described below. In the fuel injection control operation, the electric control circuit 5 is similar to an ECU for a commercially available electronically controlled gasoline fuel engine.

The configuration and function of the electric control circuit 5 are as described below. The electric control circuit 5 receives the engine speed N (rpm), the accelerator opening L (deg.), the crank signal θ per ° CA (crank angle), and so on from sensors (not shown). All these sensors can be conventioal sensors. The electric control circuit 5 includes a clock signal generator for generating clock signals having pulse intervals of 1 μsec.

The electric control circuit 5 has a ROM storing a map of the fuel injection amounts q (mm³/st) for each detected engine speed N and accelerator opening L. The ROM also stores a map of an injection start timing $\theta_B$ (° CA) for INJ-B corresponding to the detected engine speed N and accelerator opening L. The ROM further stores a map of the open duration of the fuel injection valve 1 corresponding to the calculated fuel injection amount.

A maximum fuel injection amount $q_C$(MAX) (mm³/st) for INJ-C can be set with a dial mounted outside the casing of the electric control circuit 5. The electric control circuit 5 drives the igniter 341 to cause the spark plug 3 to produce a spark. This operation will be described later.

The sequence of operation for the above will be described below.

(i) In response to the detected engine speed N and the accelerator opening L, the injection start timing $\theta_B$ is retrieved from the map in the ROM. Using the crank signal and the clock signal, the electric control circuit 5 produces a trigger signal at the injection start timing $\theta_A$ for INJ-A (fixed at about 10° CA after the bottom dead center of the compression stroke), the injection start timing $\theta_B$ for INJ-B, and the injection start timing $\theta_C$ (=$\theta_B$+1 msec) for INJ-C.

(ii) The fuel injection amount q is retrieved from the map in the ROM in accordance with the input detected engine speed N and accelerator opening L. The retrieved injection amount q is compared with the prestored fuel injection amount $q_B$ for INJ-B, for example, 3 mm³/st, and with the prestored maximum fuel injection amount $q_C$(MAX), e.g., 15 mm³/st for INJ-C.

(iii) If $q < q_B + q_C$(MAX), the following operations are performed:
1. No injection is performed at timing $\theta_A$.
2. The valve open signal is supplied to the fuel injection valve 1 for the period $\tau_B$ (μsec) corresponding to the fuel injection amount $\theta_B$ at the timing $q_B$.
3. The valve open signal is supplied to the fuel injection valve 1 for the period $\tau_C$ (μsec) corresponding to the fuel injection amount $q_C$ (q−$q_B$) at the timing $\theta_C$.

(iv) If $q \geq q_B + q_C$(MAX), the following operations are performed:
1. The fuel injection amount $q_A = q - q_B - q_C$(MAX) at the timing $\theta_C$ is calculated. If the period $\tau_A$ corresponding to the timing $q_A$ is 50 μsec or more, the valve open signal is supplied to the fuel injection valve 1 at the timing $\theta_A$ for the period $\tau_A$.
2. The valve open signal is supplied to the fuel injection valve 1 at the timing of $\theta_B$ for the period $\tau_B$. The valve open signal is supplied to the fuel injection valve 1 at the timing $\theta_C$ for the time interval corresponding to the fuel injection amount $q_C$.
3. If $\tau_A < 50$ μsec, fuel injection is not performed at the timing $\theta_A$.
4. The valve open signal is supplied to the fuel injection valve 1 at the timing $\theta_B$ for the period $\tau_B$. The valve open signal is supplied to the fuel injection valve 1 at the timing $\theta_C$ for the time interval corresponding to (q−$q_B$).
5. Note that the amount $q_C$ can exceed the maximum fuel injection amount $q_C$(MAX), if necessary, in exceptional circumstances.

(v) A signal is supplied to the igniter 41 at the stop timing of the auxiliary fuel injection INJ-B started at a timing $\theta_B$ or at a timing t μsec delayed therefrom. In response to this signal, the igniter 41 drives the ignition coil 42 and causes the spark plug 3 to produce a spark.

Figure 5:
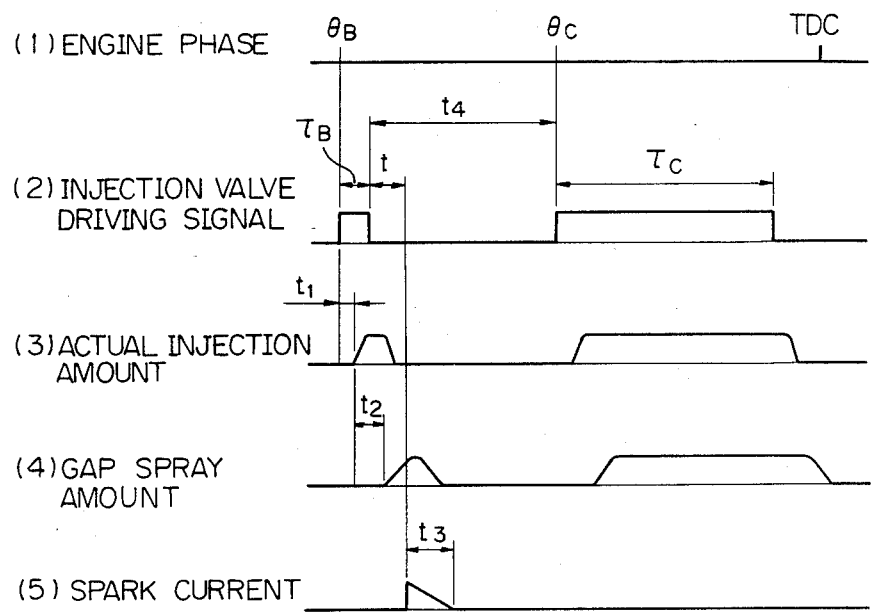
FIG. 5 shows signal waveforms explaining the operation of the apparatus shown in FIG. 1.

This control procedure will be described in more detail. A method of determining the timing for supplying a drive signal to the igniter 41, that is, the timing ($\theta_B + \tau_B + t$) will be described with reference to FIG. 5. FIGS. 5(1) to 5(5) show an engine phase, a fuel injection valve driving signal, an actual fuel injection amount, a gap spray amount, and a spark current, respectively.

When the crank phase of the internal combustion engine E is $\theta_B$, the valve open signal is supplied to the fuel injection valve 1 for the period $\tau_B$ (about 100 μsec). In response to this signal, the fuel injection valve 1 is not opened immediately but is opened with a delay time $t_1$ (about 50 μsec) from the timing $\theta_B$. When this injection is an auxiliary fuel injection and a spray produced by this injection reaches the gap of the spark plug 3, there is another delay time $t_2$. The time $t_2$ changes in accordance with the strength of the swirl SWR, the distance between the fuel injection valve 1 and the spark plug 3, and so on. However, the time $t_2$ is about 50 to 150 μsec. A spark is produced and ignites the fuel spray in this gap. The spark maintaining time $t_3$ is about 150 μsec in the case of a capacitive discharge-type ignition system (CDI). Under these circumstances, a delay time t of the spark start timing measured from the valve close signal of the fuel injection valve 1 satisfies the equation:

$$t_\omega + t_2 - \tau_\infty - t_3 < t < t_\omega + t_2$$

When the time t does not satisfy this inequality, the spark cannot reach the spray produced in the gap and ignition does not occur.

Referring to FIG. 5, the auxiliary fuel injection period $\tau_B$ is 100 μsec, the subsequent main fuel injection period $\tau_C$ is 300 to 2,000 μsec, the delay time $t_1$ of the fuel injection valve response is 50 μsec, the spray flight time $t_2$ is 50 to 150 μsec, the spark maintaining time $t_3$ (CDI type engine) is 150 μsec, and an interval $t_4$ is 1,000 to 1,500 μsec.

Figure 6B:
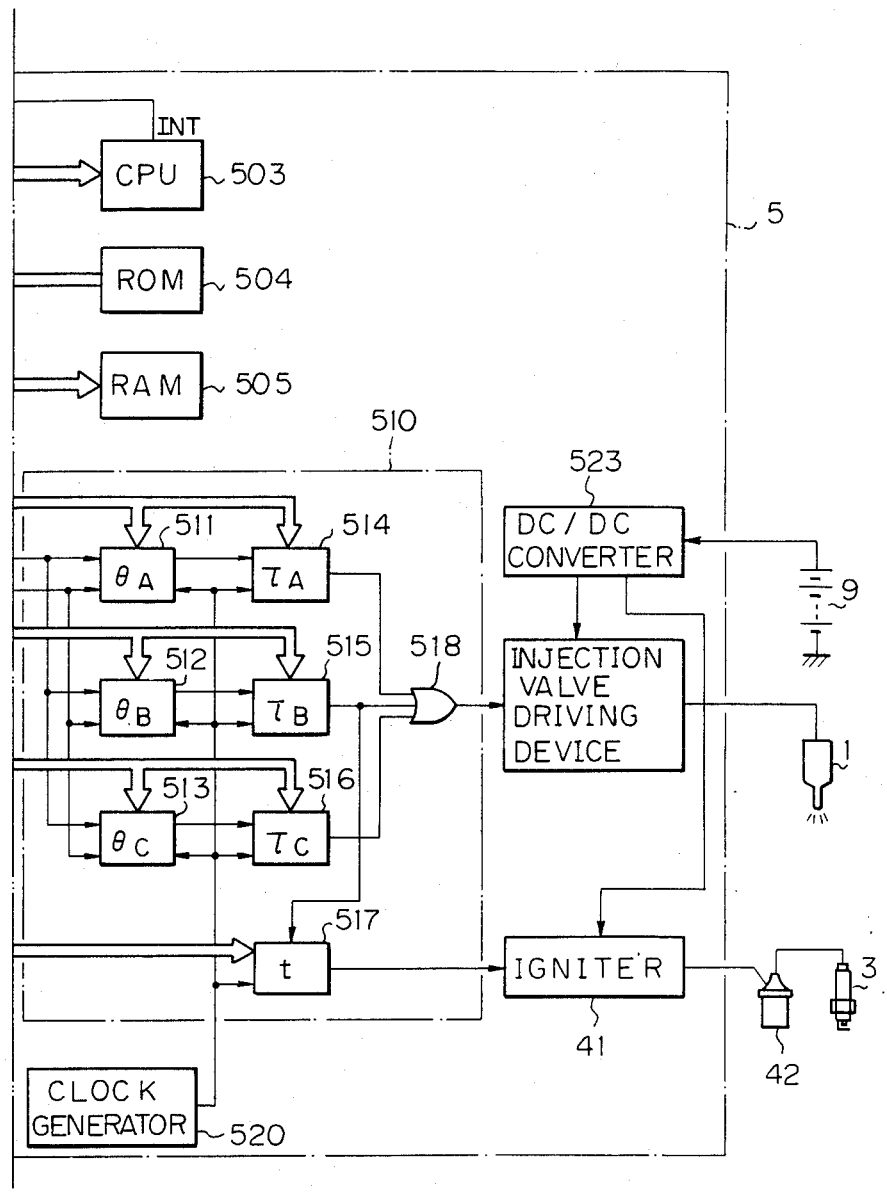

The electric control circuit 5 will be described below. FIG. 6 shows the configuration of the electric control circuit 5. An input interface 501 processes signals from an angle sensor 611 consisting of a magneto-resistive element (MRE), a reference position sensor 612, and a stroke discrimination sensor 616. The input interface 501 thus detects the engine phase and the engine speed. The angle sensor 611 detects one of 360 teeth formed on the outer periphery of a disk 614 mounted on a crankshaft 613 of the engine (not shown). Thus, the angle sensor 611 generates 360 pulses per revolution of the crankshaft, i.e., a signal per one ° CA.

The reference position sensor 612 detects one projection 615 formed in the vicinity of the outer periphery of the rotary disk 614 and generates a signal at 200° CA BTDC. The stroke discrimination sensor 616 detects a projection of a camshaft 617 rotating at a rotational frequency ½ that of the crankshaft and generates a signal at 210° CA BTDC. Therefore, the reference position signal generated immediately after the stroke discrimination signal corresponds to 200° CA BTDC of the compression stroke, and the rotational phase of the crankshaft can be correctly detected based on this reference signal.

Engine speed information from the input interface 501 is supplied to a bus line 506, and the reference signal from the input interface 501 is supplied to a CPU 503 as an interrupt signal. The reference signal and the angle signal from the input interface 501 are supplied to an output interface 510 to be described later.

An A/D interface 502 receives a voltage from a potentiometer 622 for detecting an opening of an accelerator 621 and converts it into a digital signal. The digital signal is supplied to the bus line 506. A digital switch 63 has a dial for setting a maximum fuel injection amount $q_C$ (MAX) for INJ-C, and a digital interface 530 connects the value set by the digital switch 63 to the bus line 506.

The interrupt input port of the CPU 503 receives the reference signal generated at 200° CA BTDC of the compression stroke from the input interface 501. In response to the signal input to its interrupt input port, the CPU 503 is started to determine the engine conditions based on the input information and controls the fuel injection amount, injection timing, and ignition timing to be described later. A ROM 504 stores a control program of the CPU 503 and various other data. A RAM 505 stores data of the CPU 503.

The bus line 506 serves to allow data exchange between respective components in the electrical control circuit 5. The output interface 510 generates a current signal to the fuel injection valve 1 and an ignition timing signal for the igniter 41. The output interface 510 receives the reference signal and the angle signal from the input interface 501, and the clock signals of a period of 1 μsec from a clock generator 520.

The output interface 510 has 7 internal timing generators. A $\theta_A$ generator 511 generates the timing $\theta_A$ for INJ-A calculated by the CPU 503 using the reference signal, the angle signal, and the clock signal. The generator 511 consists of a main counter which is counted down by angle signals from the reference signal, and a subcounter which is counted down by clock signals from a unit value of the angle signal (in this case, less than 1° CA). A $\theta_B$ generator 512 and a $\theta_C$ generator 513 have the same configuration as that of the $\theta_A$ generator 511.

A $\tau_A$ generator 514 generates a period $\tau_A$ for INJ-A which is calculated by the CPU 503. The $\tau_A$ generator 514 consists of a counter which is started by a signal from the $\theta_A$ generator 511 and which is counted down by the clock signals. A $\tau_B$ generator 515 and a $\tau_C$ generator 516 have the same configuration as that of the $\tau_A$ generator 514.

A t generator 517 generates an ignition timing signal. The t generator 517 comprises a counter which is started at the termination of the auxiliary fuel injection INJ-B by the $\tau_B$ generator 515 and is counted down by clock signals from the time t calculated by the CPU 503. A 3-input OR circuit 518 receives outputs from the $\tau_A$ generator 514, the $\tau_B$ generator 515, and the $\tau_C$ generator 516, and produces an OR output. The output from the OR circuit 518 is a composite signal of these three different signals.

An injection valve driving circuit 521 receives the fuel injection current signal from the OR circuit 518. When the current signal is logic level "1", the injection valve driving circuit 521 applies −200 V to the fuel injection valve 1. When the current signal is logic level "0", the driving circuit 521 applies +500 V to the fuel injection valve 1. Thus, the fuel injection valve 1 is opened at −200 V, and is closed at +500 V.

The igniter 41 comprises a conventional CDI-type igniter circuit and is triggered at a predetermined delay time t after INJ-B by disabling the output signal from the t generator 517. When the igniter 41 is triggered, the CDI is started. A high current is then supplied to the primary coil of the ignition coil 42, a high voltage is induced in the secondary coil, and the spark plug 3 ignites the fuel. A known DC/DC converter 523 boosts a low DC voltage from a battery 9 to a DC voltage of about 250 V. This high voltage is applied to the driving circuit 521 and the igniter 41.

Figure 7:
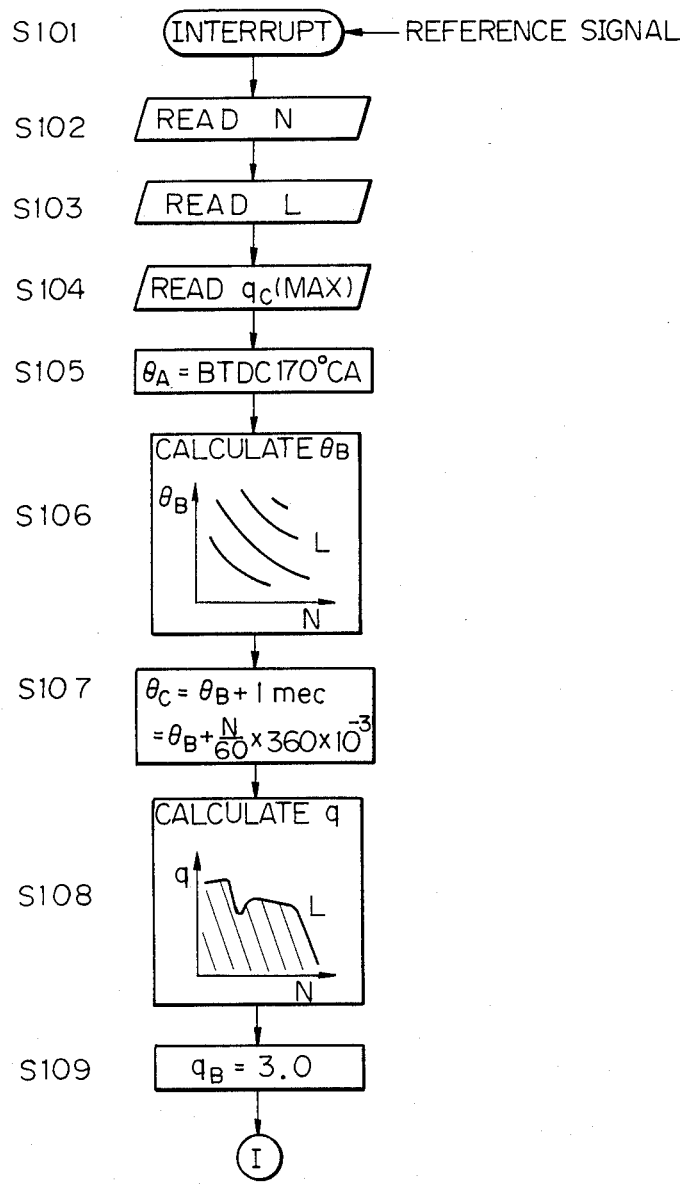
FIGS. 7, 8, and 9 are flowcharts showing the operation of the circuit shown in FIG. 6.
Figure 8:
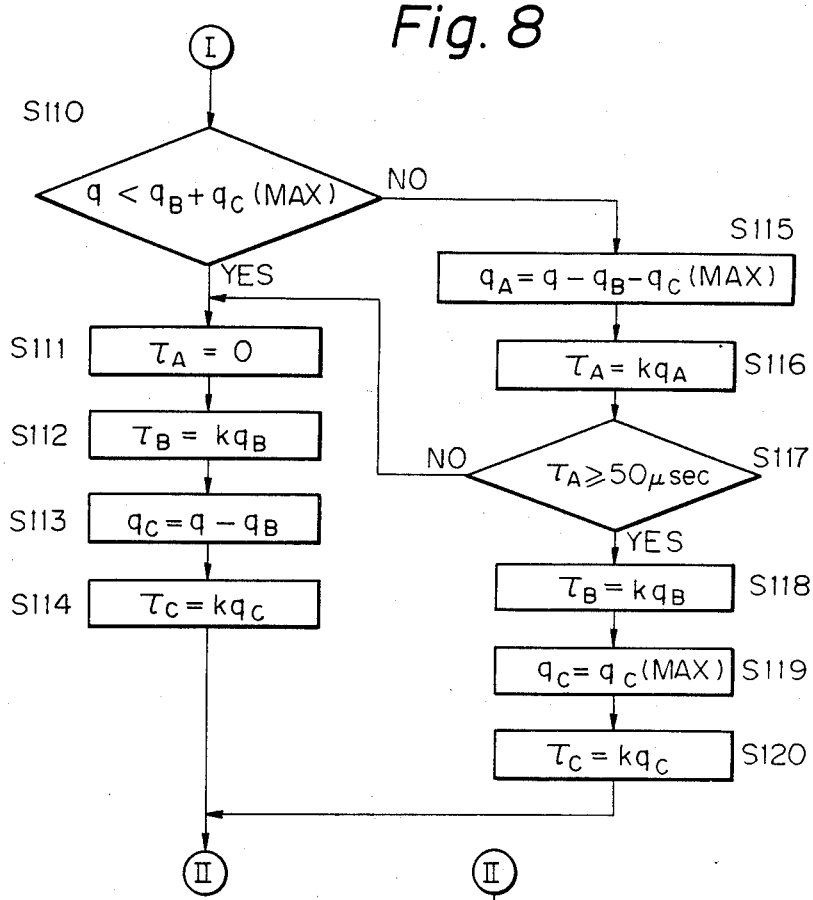
Figure 9:
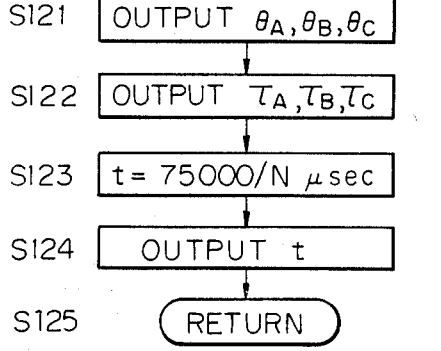

The mode of operation of the electrical control circuit 5 shown in FIG. 5 will be described with reference to FIGS. 7, 8, 9, and 10. FIGS. 7, 8 and 9 are flowcharts (steps S101 to S125) explaining the arithmetic control contents of the CPU 503, and FIG. 10 is a timing chart showing the signals at the respective portions.

Figure 10:
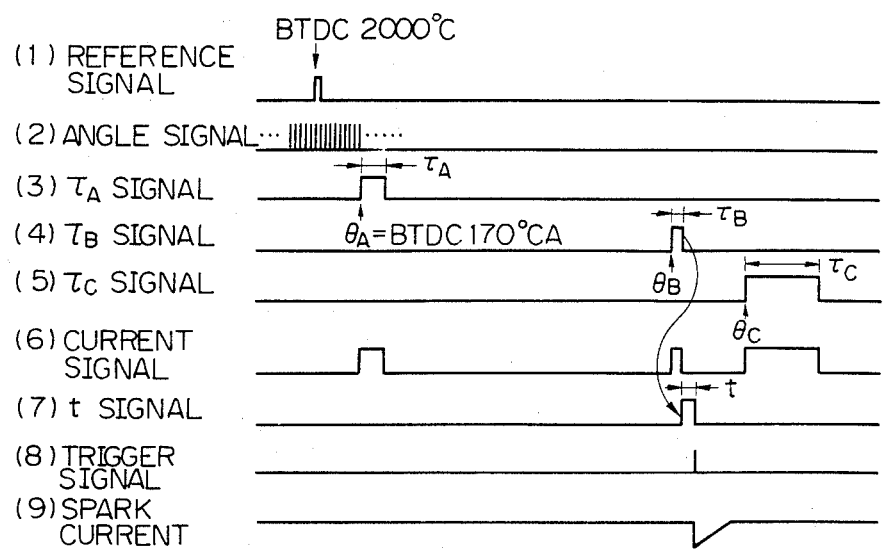
FIG. 10 shows signal waveforms explaining the operation of the circuit shown in FIG. 6.

FIGS. 10(1) to 10(9), respectively, show a reference signal, an angle signal, a $\tau_A$ signal, a $\tau_B$ signal, a $\tau_C$ signal, a current signal, a t signal, a trigger signal, and a spark current. The CPU 503 is started upon interruption by the reference signal at 200° CA BTDC of the compression stroke. The CPU reads in the engine speed N through the input interface 501 (S102), the accelerator opening L through the AD interface 502 (step S103), and a preset maximum fuel injection amount $q_C$(MAX) (step S104). The CPU then calculates the fuel injection timing.

Since the timing $\theta_A$ for INJ-A is 10° CA after the bottom dead center of the compression stroke, i.e., fixed at 170° CA BTDC, it is determined that $\theta_A = 170°$ CA BTDC (S105). Since the timing of the auxiliary fuel injection INJ-B changes in accordance with engine conditions, the timing $\theta_B$ for INJ-B in accordance with predetermined engine conditions N and L is retrieved from the map stored in the ROM 504 (the map is obtained by experiments) S(106). Since the timing for INJ-C is 1 msec after INJ-B, 1 msec is converted into an angle using the engine speed N and $\theta_C = \theta_B + N/60 \times 360 \times 10^{-3}$ is calculated (S107).

The fuel injection amount is calculated next. The total fuel injection amount q in accordance with predetermined engine conditions N and L is retrieved from the map stored in the ROM 504 (the map is obtained by experiments) (S108). Since the INJ-B fuel injection amount $q_B$ is fixed, for example, at 3 mm$^3$/st, it is determined that $q_B = 3.0$ (S109). The total fuel injection amount q is compared with $q_B + q_C(MAX)$ (S110). If $q < q_B + q_C(MAX)$, the prior main fuel injection INJ-A need not be performed. That is, it is determined that the INJ-A fuel injection period is $\tau_A = 0$ (S111). The INJ-B fuel injection period $\tau_B$ is calculated according to $\tau_B = kq_B$, where the fuel injection amount $\tau_B$ is multiplied by a flow rate coefficient k of the fuel injection valve 1 (S112).

The INJ-C fuel injection amount $q_C$ is the difference $(q - q_B)$ between the total fuel injection amount q and the INJ-B fuel injection amount $q_B$ (S113). The period $\tau_C = kq_C$ is calculated (S114). When $q \geq q_B + q_C(MAX)$, the prior main fuel injection INJ-A is calculated by $q_A = q - q_B - q_C$ (S115). The fuel injection amount $q_A$ is converted into the INJ-A fuel injection period $\tau_A = kq_A$ (S116).

The CPU then checks whether the period $\tau_A$ is 50 μsec or more (S117). If the period $\tau_A$ is less than 50 μsec, it is less than the response limit of the fuel injection valve 1, and the prior main fuel injection INJ-A is not performed. In this case, the flow branches to the routine of $\tau_A = 0$ (S111). When the period $\mu_A$ is 50 μsec or more, the prior main fuel injection INJ-A can be performed. Therefore, calculations $\tau_B = kq_B$, $q_C = q_C(MAX)$, and $\tau_C = kq_C$ are performed to determine the periods of the respective injection operations (S118, S119, and S120). The timings $\theta_A$, $\theta_B$, and $\theta_C$ and the periods $\tau_A$, $\tau_B$, and $\tau_C$ are supplied to the output interface 510 (S121, S122). The actual drive signals are automatically generated by the hardware of the output interface.

Calculation of the ignition timing will be described below. As described above, the ignition timing must satisfy the relationship $t_1 + t_2 - \tau_B - t_3 < t < t_1 + t_2$ with reference to the termination timing of the auxiliary fuel injection INJ-B. In the above relationship, the spray flight time $t_2$ changes in accordance with the engine speed, but $t_1$ and $t_3$ remain unchanged.

Figure 11:
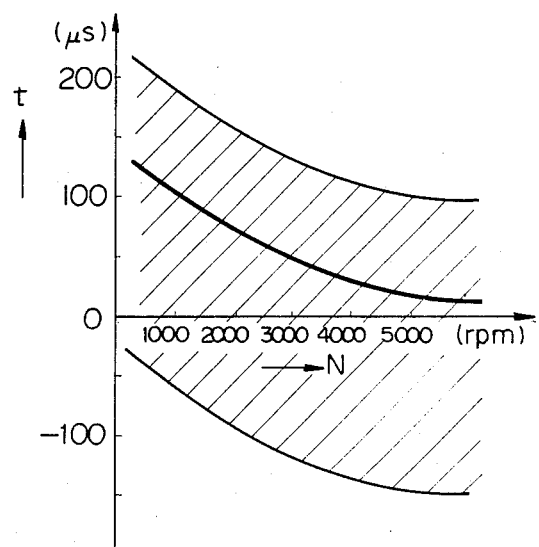
FIG. 11 is a graph explaining the operation of the circuit shown in FIG. 6.

The above operation is described with reference to FIG. 11. In FIG. 11, the engine speed N (rpm) is plotted along the abscissa, and the time t (μs) is plotted along the ordinate. A hatched region corresponds to a region wherein t is plotted. In this case, $t = 0$ is not included. Therefore, it will be seen that ignition can be performed at termination of the auxiliary fuel injection without a complex operation. However, after application of the ignition voltage it is preferable that a spark of maximum energy be applied slightly inward from the distal end of the spray. The timing is indicated by a thick curve in FIG. 11.

The timing is a function of the engine speed and is approximated at $t = 75000/N$ μsec. Therefore, the CPU calculates $t = 75000/N$ μsec (S123), supplies the time t to the output interface (S124), and returns (S125). As described earlier with reference to the circuit configuration, a trigger signal is generated within the time t after the termination of the auxiliary fuel injection INJ-B, the igniter 41 is actuated, and the spark plug 3 ignites the spray.

In practice, many other changes and modifications may be made within the spirit and scope of the present invention. For example, the configuration and operation sequence of the electric control circuit 5 described above are examples only and various other configurations and operation sequences may be adopted. A detailed description of such modifications will be omitted for the sake of simplicity. Furthermore, for the sake of descriptive convenience, only a single cylinder is described. However, a similar operation may be performed for a plurality of cylinders. In an actual engine, a water temperature sensor, an intake pressure sensor, and the like are normally incorporated to allow correction of the fuel injection amount or fuel injection timing in accordance with outputs from such sensors. However, a detailed description of such sensors is omitted.

According to the present invention, there is provided an apparatus for operating a spark-ignition DI injection type internal combustion engine, comprising a fuel injection valve capable of supplying fuel used for explosion at three separate times: first, the prior main fuel injection (INJ-A) in the vicinity of or prior to the bottom dead center of the compression stroke; second, the preceding auxiliary fuel injection (INJ-B) in the vicinity of the top dead center of the compression stroke; and third, the subsequent main fuel injection (INJ-C) following the auxiliary fuel injection; an electric control circuit for the fuel injection valve; a spark plug for producing a spark in synchronization with the auxiliary fuel injection (INJ-B); and an igniter.

The electric control circuit of the fuel injection valve performs the prior main fuel injection INJ-A, the auxiliary fuel injection INJ-B, and the subsequent main fuel injection INJ-C at full load. As the load decreases, the control circuit generates control signals to first, decrease the fuel injection amount in the prior main fuel injection INJ-A, second, stop the prior main fuel injection INJ-A, and third, decrease the fuel injection amount of the subsequent main fuel injection INJ-C.

An electric control circuit may be adopted which generates control signals under the condition that a maximum fuel injection amount of the subsequent main fuel injection INJ-C is controllable in accordance with the magnitude of the ignitability of the fuel, e.g., the cetane number.

An electrically operated fuel injection valve for injecting fuel into a cylinder may be adopted wherein the fuel injection amount is determined solely by the opening time of the fuel injection valve.

In the apparatus of the embodiment described above, two fuel injections, i.e., the auxiliary fuel injection INJ-B and the subsequent main fuel injection INJ-C, are performed for medium and light loads. The auxiliary fuel injection INJ-B is performed in a range of 50 to 10° CA before the top dead center of the compression stroke and for a time period of about 100 μsec. Fuel injected from the fuel injection valve 1 produces a fuel-air mixture in a spark gap of the spark plug 3 within about 100 μsec. The spark is then produced in the gap to ignite the air-fuel mixture. After a delay of about 1 msec, the overall spray produced by the auxiliary fuel injection INJ-B forms a flame and the spray produced by the subsequent main fuel injection INJ-C meets this flame to cause diffuse combustion, known as Diesel combustion.

This apparatus has the following advantages. First, since the air-fuel mixture is ignited with a spark plug, fuel having a high cetane number is not required. Second, ignition is performed only for the spray produced by the auxiliary fuel injection INJ-B. Since the injection amount INJ-B is fixed irrespective of varying engine conditions, an air-fuel mixture of a predetermined ratio is constantly supplied to the spark gap of the spark plug 3, thereby allowing reliable ignition. Third, since the ignition timing (spark producing timing) need only be synchronized with the auxiliary fuel injection INJ-B, a separate control circuit for determining the ignition timing is not required. Fourth, since combustion by the subsequent main fuel injection INJ-C is a completely diffuse combustion, the intake air amount need not be controlled. Therefore, an intake air throttle valve is not required, the pump loss is smaller than that with a general gasoline engine, and fuel consumption is low.

In the case of a heavy or full load, three fuel injections, i.e., the prior main fuel injection INJ-A, the auxiliary fuel injection INJ-B, and the subsequent main fuel injection INJ-C are performed. The prior main fuel injection INJ-A is performed at 10° CA after the bottom dead center of the compression stroke, and the spray produced is diffused into the combustion chamber by the swirl SWR and is well premixed with the intake air. The air-fuel mixture has an excess air factor twice that of a theoretical mixture ratio and self-ignition will not be caused even with fuel having a low octane number. If there is a possibility that self-ignition may occur, the fuel injection amount for INJ-C is increased, and that for INJ-A is decreased accordingly. Then, since an excess air factor is increased, the possibility of self-ignition is eliminated. The premixture having a high excess air factor is partially combusted by ignition in the auxiliary fuel injection INJ-B but is mainly combusted by diffusion combustion of the subsequent fuel injection INJ-C, thereby performing a torch combustion. In this case, in addition to the first to fourth advantage enumerated above, self-ignition and power output increase can be prevented by minimizing the excess air factor of the premixture, since the torch combustion resulting when premixture combustion is performed together with diffusion combustion is performed together with diffusion combustion.

In practice, the following modifications may be performed to the embodiment of the present invention. For example, the fuel injection amount for the auxiliary fuel injection INJ-B may exceed that for the subsequent main fuel injection INJ-C. Furthermore, one fuel injection operation earlier than the other is simply defined as auxiliary fuel injection. Although the fuel injection amount for the auxiliary fuel injection INJ-B is substantially constant, that for the subsequent main fuel injection changes in accordance with the accelerator opening L. In some exceptional cases, the injection amount of the subsequent main fuel injection INJ-C becomes zero at light load or during deceleration. These modifications are intended to fall within the scope of the present invention. When fuel with a relatively high cetane number is used, auxiliary fuel injection or spark ignition can be stopped after completion of combustion or warming-up. This modification also falls within the scope of the present invention.

In the embodiment described above, fuel is a petroleum-type fuel such as naphtha, gasoline, kerosene, light oil, heavy oil or mixtures thereof. Although the calorific values of these types of fuel are substantially the same, if fuels having different calorific values are used such as methyl alcohol, ethyl alcohol, or plant oil, the fuel injection amounts in the respective fuel injections INJ-A, INJ-B, and INJ-C must be changed in accordance with the calorific value of the fuel used. When a dial for setting the fuel injection amounts is mounted on the outer side of the casing of the electrical control circuit 5, a multi-fuel engine can be obtained.

In the above embodiment, a maximum fuel injection amount for INJ-C is set by an operator with a dial mounted outside the casing of the electrical control circuit 5. However, when knocking is detected, the fuel injection amount for INJ-C can be increased to reduce the fuel injection amount for INJ-A, as in a commercially available knocking control system.

Furthermore, in the above embodiment, two fuel injection operations, i.e., INJ-B and INJ-C, are performed. However, at an extreme light load condition or during deceleration, only the auxiliary fuel injection INJ-B is performed and the fuel injection amount for INJ-B is slightly increased or decreased.

Figures 12, 13:
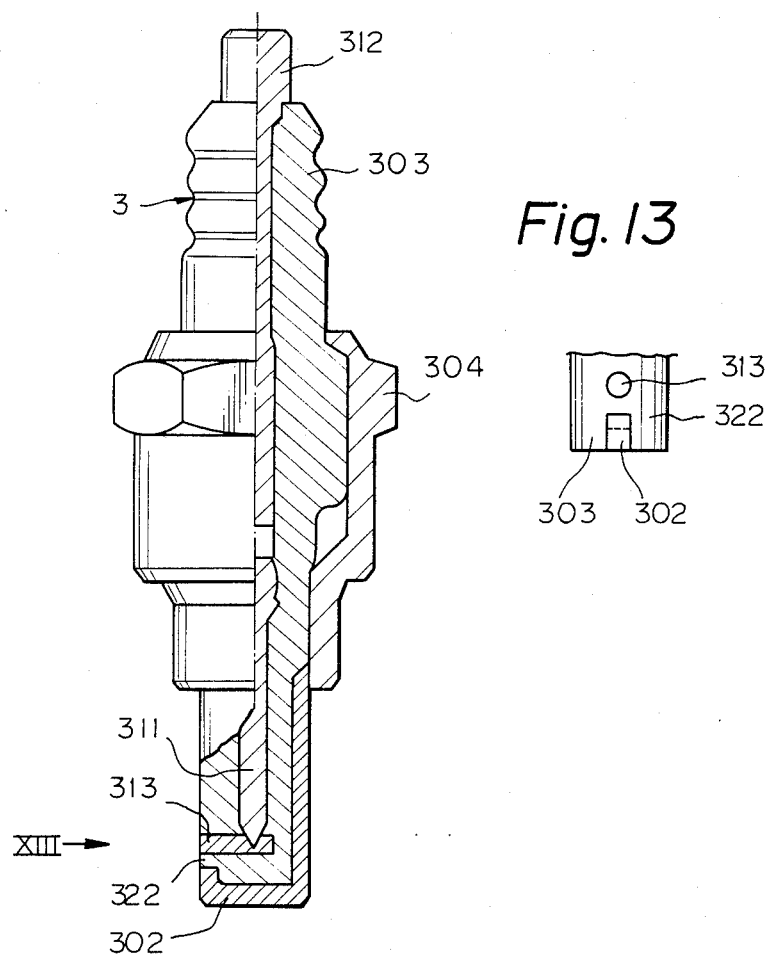
FIG. 12 is a view of the construction of a spark plug used in the apparatus shown in FIG. 1.
FIG. 13 is a view of a portion XIII of the spark plug shown in FIG. 12.

The spark plug 3 which can be used in the apparatus shown in FIG. 1 is shown in FIGS. 12 and 13. The portion XIII of the spark plug shown in FIG. 12 is shown in FIG. 13.

In the spark plug 3 shown in FIG. 12, a central shaft 311 of a metal is electrically connected to a terminal 312. A central electrode 313 is made of an electrically conductive ceramic material. A grounding electrode 302 is similarly made of an electrically conductive ceramic material. The electrodes 313 and 302 are made of, for example, $MoSi_2$. An insulator 303 consists of an electrically insulating ceramic, e.g., $Si_3N_4$. The central shaft 311, the central electrode 313, the grounding electrode 302, and the insulator 303 are formed integrally by hot pressing. The central electrode 313 is electrically connected to the central shaft 311, and the grounding electrode 302 is electrically connected to a metal housing 304. The central electrode 313 and the grounding electrode 302 are separated by about 1 mm on the insulator 303.

Figure 14:
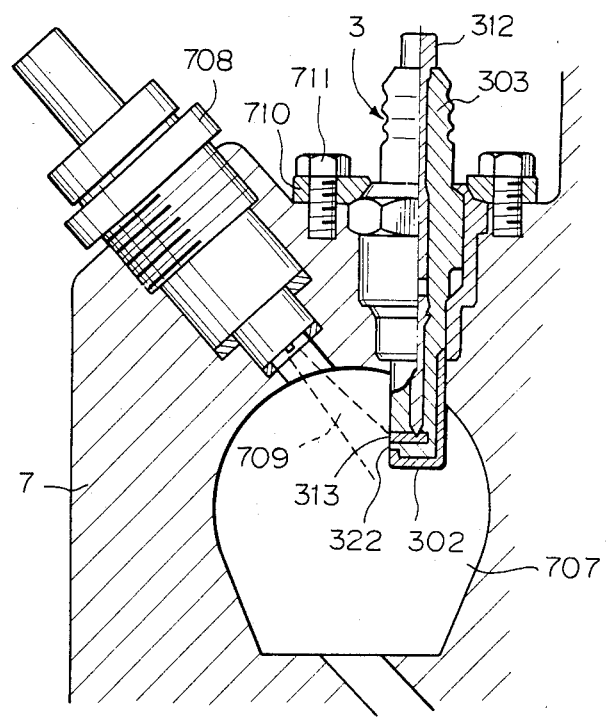
FIG. 14 is a sectional view of the method of mounting the spark plug into a cylinder head.

FIG. 14 shows a mounting method of the spark plug 3 on a cylinder head 7. This embodiment corresponds to the case wherein the present invention is applied to an eddy-current type diesel engine. Referring to FIG. 14, reference numeral 707 denotes an eddy current chamber, 708 a fuel injection nozzle, and 709 a spray path of the fuel.

The spark plug 3 is fixed to the cylinder head 7 with a holder 710 and a bolt 711. A discharge path 322 between the central electrode 313 and the grounding electrode 302 is directed to shield the flight path of a spray 709.

The mode of operation of the above construction will be described below.

When injection is performed by the fuel injection nozzle 708 and the spray reaches the discharge path 322, a high voltage is applied from an ignition source (not shown) between the electrodes 313 and 302 of the spark plug 3. Thus, spark ignition is performed between the electrodes 313 and 302 through the discharge path 322. Fuel on the discharge path 322 is then ignited and combustion is started.

In a conventional spark plug, the fuel spray is sprayed onto the leg portion of the insulator near the central electrode. When the spray is carbonized by heat, if a high voltage is applied to the plug, the voltage leaks to the housing through carbon adhered to the leg surface, thus disenabling ignition. In contrast, in the spark plug of the present invention, even if the spray adheres to the leg portion of the insulator and is carbonized, the leak path remains the same as the discharge path 322. Therefore, the discharge path 322 is constantly burned away by spark discharge, so that the carbon is removed and ignition of the fuel spray can be maintained.

In a diesel engine, the compression ratio is high, and in order to ignite the mixture in the vicinity of the top dead center of the compression stroke, a high spark discharge voltage is required. When the ignition system capacity is considered, it is impossible to increase the spark gap length over 0.3 mm with a conventional air gap discharge type spark plug. Furthermore, since the required voltage is high, consumption of the electrode is significant, which results in a widening of the gap, and thereby disenabling discharge. Such consumption of the electrode is accelerated when the electrode temperature is high.

The spark plug of the present invention is of the creeping discharge type wherein the discharge path 322 is a creeping gap. Therefore, the applied discharge voltage can be lowered, and the discharge path can be kept to 1 mm or more, thereby allowing the trapping of more spray. Since the distal ends of the electrodes 313 and 302 are embedded in the insulator 303, heat radiation from the distal ends of the electrodes is facilitated to prevent temperature increase and electrode consumption. Even if some consumption does occur, since creeping discharge is performed, the applied voltage does not become excessively increased. Furthermore, since the electrodes 313 and 202 are made of an electrically conductive material, consumption is further prevented.

Figure 15:
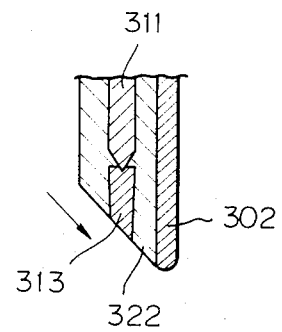
FIGS. 15, 16 and 17 are views of modifications of the spark plug.
Figure 16:
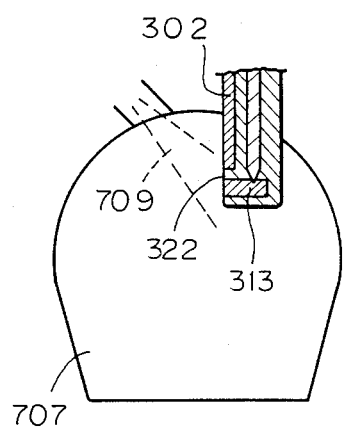
Figure 17:
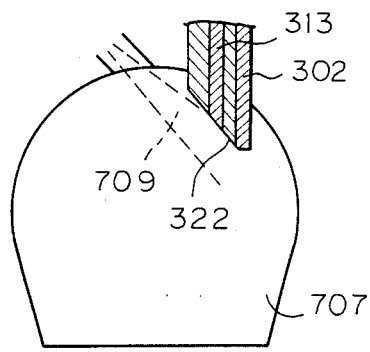

The modifications of the structure of the spark plug are shown in FIGS. 15, 16 and 17.

The material of the plug electrodes 313 and 302 may be any material which is electrically conductive and resistant to consumption. For example, an anti-consumption metal such as platinum or nickel chromium may be used.

The spark plug shown in FIG. 12 is particularly effective when an ignition source capable of repeated discharge is utilized. Since the discharge path of the spark plug traverses the spray flight path, the spray is adhered to the spark plug, and the adhered spray is carbonized to cause the leakage of the electric current. To prevent this, a repeated discharge is performed to burn away the carbon and to keep the discharge path at a high temperature, thereby facilitating ignition. A repeated discharge device such as a known alternate current continuous arc circuit (ACA circuit) (See Japanese Unexamined Patent Publication (Kokai) No. 5634964 corresponding to U.S. Pat. No. 4,356,807 may be used.

We claim:

1. A method for operating an internal combustion engine having a fuel injection valve for injecting fuel into a cylinder, a spark plug arranged adjacent to said fuel injection valve for carrying out ignition in said cylinder, an ignition coil connected to said spark plug, and an igniter connected to said ignition coil, said method comprising the steps of:
carrying out a prior main fuel injection (INJ-A) during heavy and full engine load conditions in the vicinity of or preceding the bottom dead center of the compression stroke;
carrying out an auxiliary fuel injection (INJ-B) in the vicinity of the top dead center of the compression stroke;
carrying out a subsequent main fuel injection (INJ-C) after said auxiliary fuel injection is terminated; and
carrying out the ignition of the spray produced by said auxiliary fuel injection (INJ-B) by said spark plug concurrently with said subsequent main fuel injection (INJ-C).

2. An apparatus for operating an internal combustion engine comprising:
a fuel injection valve for injecting fuel into a cylinder;
a spark plug located adjacent to said fuel injection valve in the forward direction of a swirl formed in said cylinder for carrying out the ignition in said cylinder;
an ignition coil connected to said spark plug;
an igniter connected to said ignition coil; and
an electric control circuit for supplying controlled energization signals to said fuel injection valve and said igniter, said electric control circuit producing the optimum energization signal for said fuel injection valve and the optimum energization signal for said igniter for carrying out a prior main fuel injection, a predetermined auxiliary fuel injection and a subsequent main fuel injection following to said predetermined auxiliary fuel injection based on a signal representing the operating condition of the engine;
said fuel injection valve capable of supplying the fuel said for one explosion at three separate times:
first, the prior main fuel injection (INJ-A) in the vicinity of or preceding the bottom dead center of the compression stroke;
second, the auxiliary fuel injection (INJ-B) in the vicinity of the top dead center of the compression stroke; and
third, the subsequent main fuel injection (INJ-C) following said auxiliary fuel injection;
said spark plug producing a spark in synchronization with said auxiliary fuel injection (INJ-B).

3. An apparatus for operating an internal combustion engine comprising:
a fuel injection valve for injecting fuel into a cylinder;
a spark plug located adjacent to said fuel injection valve in the forward direction of a swirl formed in said cylinder for carrying out ignition in said cylinder;
an ignition coil connected to said spark plug;
an igniter connected to said ignition coil;
means for sensing rotational speed and rotational phase of said engine;
means for sensing load of the engine;
a signal generator for generating a signal for limiting a maximum value of a subsequent main fuel injection (INJ-C);
interface means for taking in signals produced externally;
calculation circuit means for receiving data from said interface means and carrying out calculations using said received data;
memory means for storing data of timing $\theta_A$ of prior main fuel injection INJ-A, data of fuel injection period $\tau_A$ of prior main fuel injection INJ-A,
data of timing of $\theta_B$ of auxiliary fuel injection INJ-B,
data of fuel injection period $\tau_B$ of auxiliary fuel injection INJ-B,
data of timing $\theta_C$ of subsequent main fuel injection INJ-C, and
data of fuel injection period $\tau_C$ of subsequent main fuel injection INJ-C, all of said data being calculated in said calculation circuit means;
fuel injection signal generating circuit means for receiving data from said memory means, signals from said rotational speed and phase sensing means, and signals from a clock generating circuit, and generating signals for prior main fuel injection INJ-A, auxiliary fuel injection INJ-B, and subsequent fuel injection INJ-C;

drive circuit means for receiving a fuel injection signal from said fuel injection signal generating circuit means and generating a drive signal for controlling said fuel injection valve; and ignition signal generating circuit means for generating an ignition timing signal on the basis of said calculated data of said auxiliary fuel injection INJ-B.

4. A method according to claim 1, wherein the switching of said fuel injection valve is carried out by a signal from an electric control circuit, said igniter is energized simultaneously with or a predetermined time (t) later than the signal of the termination of said auxiliary fuel injection (INJ-B), and an ignition by said spark plug is carried out by said energization of said igniter.

5. A method according to claim 4, wherein said predetermined time (t) is given in accordance with the equation below:

$$t_1 + t_2 - \tau_B - t_3 < t < t_1 + t_2$$

wherein $t_1$ is the response delay time of the fuel injection valve, $t_2$ is the time of flight of the fuel spray up to the spark gap of the spark plug, $\tau_B$ is the valve opening instruction signal for the auxiliary fuel injection (INJ-B), and $t_3$ is the spark maintaining time.

6. An apparatus according to claim 2, wherein said electric control circuit for said fuel injection valve generates the controlled energization signals for carrying out the prior main fuel injection (INJ-A), the auxiliary fuel injection (INJ-B), and the subsequent main injection (INJ-C) when the engine is operated at full-load, while carrying out, first, the reduction of the fuel injection amount of the prior main fuel injection (INJ-A), second, the termination of the prior main fuel injection (INJ-A), and third, the reduction of the fuel injection amount of the subsequent main fuel injection (INJ-C) in accordance with the reduction of the load of the engine.

7. An apparatus according to claim 2, wherein said electric control circuit for said fuel injection valve delivers a control signal on condition that the maximum fuel injection amount of the subsequent main fuel injection (INJ-C) is controllable in accordance with the degree of possibility of spontaneous combustion, such as the cetane number.

8. An apparatus according to claim 2, wherein said fuel injection valve for injecting the fuel into the cylinder is switched by the controlled energization signals, and the fuel injection amount of said fuel injection valve is decided solely by the valve opening time.

9. An apparatus according to claim 2, wherein said spark plug comprises a central electrode and a ground electrode both made of consumption resistant material, an insulator made of ceramic material arranged between said central electrode and said ground electrode, and a discharge gap formed between said central electrode and said ground electrode along the surface of said insulator.

10. An apparatus according to claim 3, wherein said spark plug comprises a central electrode and a ground electrode both made of consumption resistant material, an insulator made of ceramic material is arranged between said central electrode and said ground electrode, and a discharge gap formed between said central electrode and said ground electrode along the surface of said insulator.

* * * * *